United States Patent
Sasaki et al.

[11] Patent Number: 5,556,721
[45] Date of Patent: Sep. 17, 1996

[54] NON-AQUEOUS ELECTROLYTE SECONDARY BATTERY AND PRODUCTION METHOD OF THE SAME

[75] Inventors: Tomio Sasaki, Tokyo; Tsugio Sakai; Kensuke Tahara, both of Sendai, all of Japan

[73] Assignees: Seiko Instruments Inc.; Seiko Electronic Components Ltd., both of Japan

[21] Appl. No.: 274,633

[22] Filed: Jul. 13, 1994

[30] Foreign Application Priority Data

Jul. 13, 1993 [JP] Japan ................................ 5-173313

[51] Int. Cl.⁶ .................................................. H01M 4/36
[52] U.S. Cl. .......................... 429/218; 429/232; 205/59
[58] Field of Search .......................... 429/218, 232; 205/59

[56] References Cited

U.S. PATENT DOCUMENTS

| | | | |
|---|---|---|---|
| 3,544,385 | 12/1970 | Newman | 429/194 |
| 4,517,265 | 5/1985 | Bélanger et al. | 429/217 |
| 5,162,176 | 11/1992 | Herr et al. | 429/194 |
| 5,187,033 | 2/1993 | Koshiba | 429/194 |
| 5,262,255 | 11/1993 | Ito et al. | 429/217 |
| 5,278,005 | 1/1994 | Yamauchi et al. | 429/194 |
| 5,286,582 | 2/1994 | Tahara | 429/218 |

*Primary Examiner*—Stephen Kalafut
*Assistant Examiner*—Richard H. Lilley, Jr.
*Attorney, Agent, or Firm*—Adams & Wilks

[57] ABSTRACT

A non-aqueous electrolyte secondary battery comprises at least a negative electrode, a positive electrode and a non-aqueous electrolyte. The negative electrode has an active material comprised of silicon or a silicon alloy containing lithium represented by composition formula $Li_xSi$ where x satisfies $0 \leq x \leq 5$. The positive electrode has an active material comprised of a transition metal oxide. The non-aqueous electrolyte is a lithium ion-conductive non-aqueous electrolyte having at least one lithium compound comprised of one of an organic solvent and a solid polymer. The negative electrode active material is formed by absorption of lithium ions into the silicon resulting from an electrochemical reaction between the negative electrode and a lithium metal and/or a material containing lithium. A secondary battery having high voltage, high energy density, high reliability, improved current charge and discharge characteristics and a long cycle life is obtained.

16 Claims, 2 Drawing Sheets

NON-AQUEOUS ELECTROLYTE SECONDARY BATTERY AND PRODUCTION METHOD OF THE SAME

FIELD OF THE INVENTION

The present invention relates generally to a non-aqueous electrolyte secondary battery in which a material capable of absorbing and releasing lithium is used as an active material of a negative electrode and a positive electrode, and a lithium ion conductive non-aqueous electrolyte is employed, and in particular, relates to a novel secondary battery having a high voltage and a high energy density with excellent charge and discharge characteristics, a long cycle life and high reliability.

BACKGROUND ART

Non-aqueous electrolyte batteries, which use lithium as a negative electrode active material, have been widely used as power sources for memory backup, cameras and the like as primary batteries owing to advantages of high voltage, high energy density, small self-discharge and excellent long term reliability. However, in accordance with the recent remarkable development of portable type electronic instruments, communication instruments and the like, a variety of instruments which require large current outputs for batteries as power sources have been developed. Economic considerations and the realization of compact and lightweight electronic instruments demand a secondary battery having a high energy density capable of repeated charge and discharge. Research and development are actively performed for realizing secondary batteries from the aforementioned non-aqueous electrolyte batteries. However, the energy density, the charge and discharge cycle life and the reliability of such secondary batteries have not been satisfactory.

In the prior art, three types of positive electrode active materials for positive electrodes of the foregoing secondary batteries have been used depending on the nature of charge and discharge reactions. The first type is a type in which only lithium ions (cations) enter into and exit from spaces between layers, lattice positions or gaps between lattices of crystals by intercalation and deintercalation reactions and the like, such as various metal chalcogenides such as $TiS_2$, $MoS_2$, $NbSe_3$ and the like, metal oxides such as $MnO_2$, $MoO_3$, $V_2O_5$, $Li_xCoO_2$, $Li_xNiO_2$, $Li_xMn_2O_4$ and the like. The second type is a type in which principally only anions stably enter and exit by dope and undope reactions, such as conductive polymers such as polyaniline, polypyrrole, polyparaphenylene and the like. The third type is a type in which both lithium cations and anions can enter and exit (intercalation, deintercalation, or dope, undope, and the like), such as graphite intercalation compounds, conductive polymers such as polyacene, and the like.

On the other hand, as the negative electrode active materials for the negative electrodes of such batteries, the electrode electric potential is basest when only metal lithium is used, so that preferably the output voltage and energy density are highest when applied in a battery having a positive electrode using a positive electrode active material as described above. However, there have been such drawbacks in that dendrite and passivation compounds are generated on the negative electrode during charge and discharge, deterioration due to charge and discharge is large, and the cycle life is short. In order to solve such problems, it has been proposed to use a negative electrode active material capable of absorbing and releasing lithium ions such as (1) alloys of lithium and other metals such as Al, Zn, Sn, Pb, Bi, Cd and the like, (2) intercalation compounds or insertion compounds in which lithium ion is incorporated in crystal structures such as inorganic compounds such as $WO_2$, $MoO_2$, $Fe_2O_3$, $TiS_2$ and the like, graphite, carbonaceous materials obtained by calcinating organic materials and the like, and (3) conductive polymers such as polyacene, polyacetyline and the like in which lithium ion is doped.

However, generally when a battery is formed by combining a negative electrode having a negative electrode active material capable of absorbing and releasing lithium ions other than metal lithium as described above, and a positive electrode using a positive electrode active material as described above, the negative electrode active material has an electrode electric potential which is nobler than the electrode electric potential of metal lithium, so that there is a drawback in that the working voltage of the battery is fairly lower as compared with a case in which only metal lithium is used as the negative electrode active material. For example, the working voltage is lower by 0.2–0.8 V when an alloy of lithium and Al, Zn, Pb, Sn, Bi, Cd or the like is used, it is lower by 0–1 V in the case of a carbon-lithium intercalation compound, and it is lower by 0.5–1.5 V in the case of a lithium ion insertion compound such as $MoO_2$, $WO_2$ and the like.

In addition, elements other than lithium also serve as negative electrode constituting elements, so that the capacity and the energy density per volume and weight are remarkably lowered.

Further, when the alloy of lithium and the other metal in the aforementioned (1) is used, there is such a problem that the utilization efficiency of lithium during charge and discharge is low, and the cycle life is short due to generation of cracks in the electrode by repeated charge and discharge causing breakage of the electrode. In the case of the lithium intercalation compound or the insertion compound of (2), there is a drawback in that there is deterioration such as the collapse of the crystal structure, the generation of irreversible by-product materials and the like by excessive charge and discharge, and there are many ones having high (noble) electrode electric potentials, so that the battery using it has a low output voltage. In the case of the conductive polymer of (3), there is such a problem that the charge and discharge capacity, especially the charge and discharge capacity per volume, is small.

Thus, in order to obtain a secondary battery having a high voltage and a high energy density in which the charge and discharge characteristics are excellent and the cycle life is long, a negative electrode active material is necessary in which the electrode electric potential with respect to lithium is low (base), there is no deterioration such as the collapse of the crystal structure due to absorption and release of lithium ions during charge and discharge and there is no generation of irreversible materials and the like, and an amount capable of reversibly incorporating and releasing lithium ion, that is an effective charge and discharge capacity is larger.

On the other hand, with respect to the aforementioned positive electrode active materials, the first type generally has a large energy density but has such a drawback that deterioration is large due to the collapse of crystals and the generation of irreversible materials and the like due to excessive charge and excessive discharge. In addition, the second and third types reversely have such a drawback that the charge and discharge capacity, especially the charge and discharge capacity and the energy density per volume, are small.

Thus in order to obtain a secondary battery having a high capacity and a high energy density in which the excessive charge and excessive discharge characteristics are excellent, a positive electrode active material is necessary in which there is neither the collapse of crystals nor the generation of irreversible materials due to excessive charge and excessive discharge, and the amount capable of reversibly incorporating and releasing lithium ion is larger.

OBJECTS OF THE INVENTION

An object of the present invention is to provide a non-aqueous electrolyte secondary battery having a negative electrode active material with excellent reversibility characteristics.

Another object of the present invention is to provide a non-aqueous electrolyte secondary battery having a positive electrode active material with excellent reversibility characteristics.

Another object of the present invention is to provide a novel non-aqueous electrolyte secondary battery in which the charge and discharge characteristics are excellent, the cycle life is long, and the reliability is high.

Another object of the present invention is to provide a non-aqueous electrolyte secondary battery which is formed with a negative electrode active material represented by a composition formula $Li_xSi$ (wherein $0 \leq x \leq 5$), and a positive electrode active material represented by a composition formula $Li_aM_bL_cO_2$ (wherein M is one or more transition metal elements, L is one or more species of a metalloid element selected from boron B and silicon Si, $0 < a \leq 1.15$, $0.85 \leq b+c \leq 1.3$, $0 \leq c$).

Another object of the present invention is to provide a production method for a non-aqueous electrolyte secondary battery in which lithium ions are absorbed by silicon to obtain silicon containing lithium by an electrochemical reaction between silicon and lithium or a material containing lithium in the battery after assembly of the battery, or inside the battery or outside the battery during production of the battery.

In order to achieve the objects described above, the present invention proposes the use of a negative electrode using silicon containing lithium represented by a composition formula $Li_xSi$ (wherein $0 \leq x \leq 5$) as an active material, a positive electrode using a metal oxide containing a transition metal as an active material, and a lithium ion-conductive non-aqueous electrolyte dissolving or making a solid solution of a lithium compound in an organic solvent or a polymer.

DETAILED DESCRIPTION OF THE PREFERRED EMBODIMENTS

Figure 1:
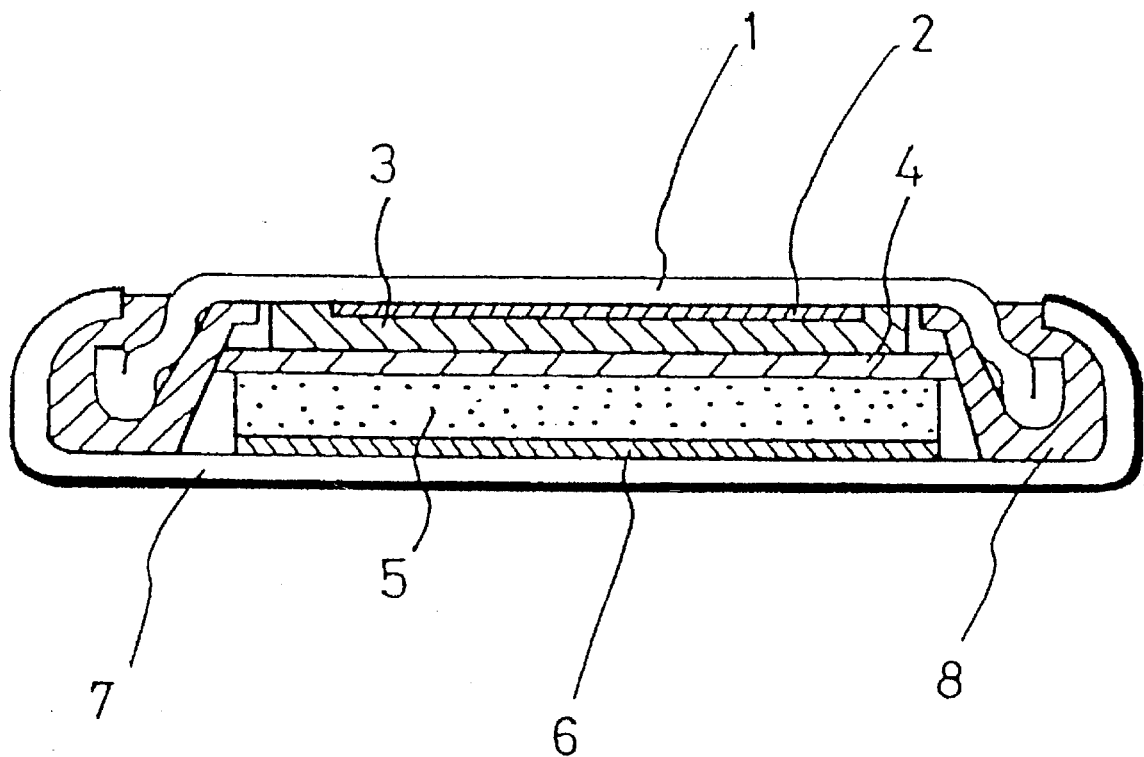
FIG. 1 is a cross-sectional view showing one example of a battery structure in accordance with the present invention.

The non-aqueous electrolyte secondary battery of the present invention comprises a negative electrode having an active material comprised of a compound of silicon and lithium or a solid solution represented by the formula $Li_xSi$, which uses silicon as a backbone structure, contains lithium in its crystal lattice structure or amorphous structure, and is capable of absorbing and releasing lithium ions by an electrochemical reaction in the non-aqueous electrolyte. As the structure state of silicon containing lithium $Li_xSi$, a solid solution of silicon and lithium, a eutectic, a compound, a mixture thereof and the like are possible, however, one in a range of $0 \leq x \leq 5$ as an average composition of the whole is used.

Silicon has a diamond type crystal structure in which tetrahedrons made by coordination of four atoms to each atom are connected, and has many gaps in the structure, so that the absorption of lithium ions is facilitated, an extremely large amount of lithium ions can be absorbed, and $5<x$ is possible for the lithium content x. In addition, charge and discharge can be performed by a reaction in which lithium ions are absorbed and released at a base electric potential of not more than 0.4 V with respect to metal lithium in the lithium ion-conductive non-aqueous electrolyte, resulting in an excellent negative electrode active material for such a secondary battery. However, there is such a drawback that when charge and discharge are performed at a large current density which is practically important, a decrease in charge capacity due to repetitive charge and discharge is remarkable, and the cycle deterioration is large. Especially, there is such a problem that the larger the charge and discharge capacity density per one cycle (charge and discharge depth) is, the larger the cycle deterioration is.

The main cause of this problem is not necessarily clear, however, it is presumed to be due to the fact that when charge and discharge are performed at a large current density, the diffusion of lithium ions into silicon is slow during charge, so that lithium is deposited on silicon or silicon containing lithium, and generation of passivation compounds and decomposition of the electrolyte and the like take place. In addition, it is presumed to be due to the fact that the spacing between lattices of crystals is enlarged due to absorption of lithium, causing expansion of volume, and increasing the internal resistance of the battery.

In order to solve these problems, in the present invention, the lithium content x in silicon containing lithium $Li_xSi$ to be used as the negative electrode active material is restricted to a range of 0–5, more preferably a range of 1–4. It has been found that when the lithium amount x, including all lithium ions absorbed by the negative electrode active material during battery production and charge, is restricted to this range, the cycle deterioration is remarkably small even when charge and discharge are performed at a large current density. In addition, it has been found that when a compound having an amorphous structure is used as silicon or silicon containing lithium, the charge and discharge characteristics are especially excellent, and the cycle deterioration is small.

As preferable production methods for the silicon containing lithium $Li_xSi$ ($0 \leq x \leq 5$) to be used as the negative electrode active material of the secondary battery of the present invention, there are exemplified the following two kinds of methods, however, there is no limitation thereto. The first method is a method in which lithium and silicon are mixed at a predetermined molar ratio, which are heated and melted in a non-oxidizing atmosphere such as in an inert atmosphere, in a reducing gas, in vacuum and the like, followed by cooling and solidification. Silicon containing lithium obtained in such a manner can be used as the negative electrode active material exactly as is or after optional processing such as grinding, grading, granulation, shaping and the like. Alternatively, the silicon containing lithium may be used in the same manner as the following second method, using an electrochemical reaction between the silicon containing lithium and lithium or a material containing lithium, lithium ions are further absorbed by the silicon containing lithium, or inversely lithium ions are released from the silicon containing lithium, thereby a negative electrode active material which is subjected to an increase or decrease in lithium amount may be realized.

The second method is a method in which an electrochemical reaction between silicon and lithium or a material containing lithium is used to allow the silicon to absorb lithium ions to obtain silicon containing lithium. As the simple substance of silicon to serve as the starting raw material, optional forms of powder, granule, plate or ribbon and the like of silicon having a monocrystal, a polycrystal or an amorphous structure are possible. However, especially when silicon having an amorphous structure is preferably used, a secondary battery excellent in charge and discharge characteristics and having small cycle deterioration is obtained, which is more preferable. In addition, as the material containing lithium for the electrochemical reaction, for example, it is possible to use an active material capable of absorbing and releasing lithium ions such as those used for the positive electrode active material, the negative electrode active material and the types exemplified in the aforementioned prior art.

The absorption of lithium ions into silicon by the electrochemical reaction can be performed in the battery after assembly of the battery, or inside or outside the battery during battery production, which can be performed as follows. (1) Silicon or a mixed agent including the silicon, a conductive agent, a binding agent and the like are molded into a predetermined shape to be used as one electrode (working electrode substrate), and metal lithium or a material containing lithium is used as another electrode (counter electrode). The electrodes are arranged so as to oppose one another while contacting with the lithium ion-conductive non-aqueous electrolyte to constitute an electrochemical cell. A current is applied at a suitable level and in a direction to allow the working electrode to perform a cathode reaction to electrochemically absorb lithium ions into the silicon. The thus obtained working electrode substrate is used as a negative electrode or as a negative electrode active material for forming a negative electrode to produce a non-aqueous electrolyte secondary battery. (2) There is given a method in which the silicon or the mixed agent of the silicon, the conductive agent, the binding agent and the like is molded into a predetermined shape to form a negative electrode substrate, to which lithium, an alloy of lithium or the like is glued under pressure or contacted to provide a laminated electrode which is used as a negative electrode to assemble into the non-aqueous electrolyte secondary battery. A certain local cell is formed by allowing the laminated electrode to contact with the electrolyte in the battery. Thereafter, the lithium or alloy of lithium conducts self-discharge, and lithium is electrochemically absorbed into the silicon of the substrate. (3) There is given a method in which the silicon is used as an active material of a negative electrode (substrate), and a material containing lithium and capable of absorbing and releasing lithium ions is used as a positive electrode active material to constitute a non-aqueous electrolyte secondary battery. Charge is performed during use of the battery, thereby lithium ions released from the positive electrode are absorbed by the silicon of the substrate.

In addition, using ordinary crystalline silicon as a raw material, the silicon having the amorphous structure can be obtained by known methods such as (1) a gas phase freezing method in which vapor deposition, sputtering or the like is performed, (2) a rapid cooling method from a melted state, (3) a plasma CVD method in which a silicon compound gas such as silane $SiH_4$ or the like is subjected to plasma decomposition (glow discharge) and the like. Generally silicon will not easily take on an amorphous structure in the case of a simple substance as compared with metal and the like, which is apt to take on a stable crystalline structure. Therefore, it is an effective method that the other elements are added in order to facilitate the generation of the amorphous structure during synthesis, so as to provide a solid solution, an alloy, a compound and the like, which is included in the present invention. The effect is especially large when one or more elements selected from hydrogen, alkaline metals such as lithium and the like, non-metals such as boron, carbon, phosphorus, nitrogen, sulphur and the like, transition metals such as iron, nickel, cobalt and the like, and alkaline earth metals and the like is added.

The silicon containing lithium represented by composition formula $Li_xSi$ thus obtained is used as the negative electrode active material.

On the other hand, as the positive electrode active material, a metal oxide containing a transition metal such as $MnO_2$, $MoO_3$, $V_2O_5$, $Li_xCoO_2$, $Li_xNiO_2$, $Li_xMn_2O_4$ and the like as a constituting element is used. Generally many transition metal oxides can stably and repeatedly absorb and release lithium ions at a high electric potential of 3 V with respect to metal lithium in the non-aqueous electrolyte, thus providing positive electrode active materials capable of repeated charge and discharge owing to such an electrode reaction. The negative electrode active material comprising silicon containing lithium represented by the formula $Li_xSi$ to be used for the secondary battery of the present invention has such advantages that the electrode electric potential with respect to metal lithium is low (base), and the charge and discharge capacity in a base region of not more than 1 V, especially not more than 0.4 V is remarkably large. Furthermore, combining the aforementioned negative electrode with the positive electrode in which the aforementioned transition metal oxide having a noble electrode electric potential of not less than 3 V with respect to metal lithium, more preferably the transition metal oxide having a high electric potential from 3.5 V to not less than 4 V such as $V_2O_5$, $Li_xCoO_2$, $Li_xNiO_2$, $Li_xMn_2O_4$ and the like, is used as the active material, a secondary battery having a high voltage and a high energy density in which the charge and discharge characteristics are excellent is obtained with a working voltage of not less than 2.5 V or from 3 to not less than 3.5 V.

Especially when used together with the negative electrode using the active material of silicon containing lithium according to the present invention, the positive electrode using the active material of a composite oxide containing lithium and having a layered structure with a composition formula which is represented by $Li_aM_bL_cO_2$, wherein M is one or more transition metal elements, L is one or more species of metalloid elements selected from boron B and silicon S, and a, b and c are $0<a\leq 1.15$, $0.85\leq b+c\leq 1.3$, $0\leq c$, respectively, results in a secondary battery having a high energy density and excellent charge and discharge characteristics in which deterioration due to excessive charge and excessive discharge is small and the cycle life is long, which is especially preferable.

The composite oxide $Li_aM_bL_cO_2$ to be used as the positive electrode active material of the battery of the present invention can be synthesized as follows. Namely, it is obtained by mixing each simple substance or each oxide, hydroxide or salt such as carbonate, nitrate or the like of lithium Li, the transition metal M and the element L at a predetermined ratio, and heating and baking in air or in an atmosphere having oxygen at a temperature of not less than 600° C., and preferably at a temperature of 700°–900° C. When as supply sources of Li, M, L and the like, oxides thereof or compounds having oxygen are used, it is also possible to perform heating and synthesis in an inert atmosphere. For the heating time, 4–50 hours are usually sufficient, however, in order to facilitate the synthesis reaction and enhance uniformity, it is effective to repeat several times the steps of heating, cooling, grinding and mixing.

In the composition formula $Li_aM_bL_cO_2$, the Li amount a is a standard stoichiometric ratio composition a=1 in the aforementioned heating synthesis, however, a non-stoichiometric composition of a degree of ±15% is also possible. In addition, by electrochemical intercalation and deintercalation, a range of $0<a\leqq1.15$ is possible. Preferably, Co, Ni, Fe, Mn, Cr, V and the like are used as the transition metal M. Particularly, Co and Ni are preferred due to their excellent charge and discharge characteristics. When $0<c$ and $0.85\leqq b+c\leqq1.3$ is used as the amount of boron and/or silicon (c) and the amount of the transition metal M (b), the remarkable effects of reduction in polarization (internal resistance) during charge and discharge and improvement in cycle characteristics are provided. On the other hand, the charge and discharge capacity for each cycle inversely lowers if the amount (c) of boron and/or silicon is too large, which becomes a maximum in the case of $0<c\leqq0.5$, so that this range is especially preferable.

Further, when the lithium-containing transition metal composite oxide such as $Li_xCoO_2$, $Li_xNiO_2$, $Li_xMn_2O_4$, $Li_aM_bL_cO_2$ and the like is used as the positive electrode active material, as in the item (3) of the preferable production method 2 of the aforementioned silicon $Li_xSi$ containing lithium, the electrode (negative electrode) is constituted by using silicon containing no lithium or having a small lithium content as the aforementioned negative electrode active material, and charge is performed during use after assembly of the battery, thereby the silicon containing lithium can be provided. Thus, since it is unnecessary to manufacture the electrode using silicon containing (a large amount of) unstable lithium which is oxidized by oxygen and moisture in atmospheric air, the production process and production apparatus become simple and the production cost is remarkably reduced.

In addition, a non-aqueous (organic) electrolyte solution in which a lithium ion dissociating lithium compound such as $LiCLO_4$, $LiPF_6$, $LiBF_4$, $LiCF_3SO_3$ and the like is dissolved as a supporting electrolyte in an organic solvent such as γ-butyrolactone, propylene carbonate, ethylene carbonate, butylene carbonate, dimethyl carbonate, diethyl carbonate, methylformate, 1,2-diethoxyethane, tetrahyfrofuran, dioxyolan, dimethylformanide and the like alone or as a mixed solvent, and a lithium ion-conductive non-aqueous electrolyte such as a solid polymer electrolyte and the like in which the aforementioned lithium compound is allowed to make a solid solution in a polymer such as polyethylene oxide, polyphosphazine cross-linked material and the like are used as the electrolyte. By using such a non-aqueous electrolyte, sufficient lithium ion conductivity is obtained even at ordinary temperatures, and a secondary battery is obtained in which deterioration such as peeling between the negative electrode and the electrolyte resulting from expansion and contraction of the negative electrode active material $Li_xSi$ due to charge and discharge, increase in battery internal resistance and the like are small, charge and discharge are possible at a large current even at ordinary temperatures, and the cycle life is relatively long.

However, it has been found that when the silicon containing lithium $Li_xSi$ ($0\leqq x\leqq5$) according to the present invention is used as the negative electrode active material so as to form a non-aqueous electrolyte secondary battery using the non-aqueous electrolyte solution as described above, the difference between the charge capacity and the discharge capacity, that is the capacity loss, remarkably differs depending on a type of the non-aqueous electrolyte solution to be used, and the charge and discharge efficiency remarkably differs. As a result, the discharge capacity is lowered due to repetitive charge and discharge, and hence the cycle life remarkably differs. A main cause thereof will be explained in detail in embodiments described below, however, it has become apparent that it is due to the fact that the non-aqueous electrolyte solution is decomposed at the negative electrode using the silicon containing lithium $Li_xSi$ as the active material during charge to generate gas, the non-aqueous electrolyte solution increases the internal pressure of the battery, which sometimes expands the battery resulting in explosion in serious cases, so that it is an important problem also from a viewpoint of safety. If such a battery is actually used in an electronic instrument or the like, breakage of the electronic instrument may result.

Generally the non-aqueous electrolyte solution is also oxidized or reduced by an electrochemical reaction when a high electric potential or a low electric potential without a stable region is applied. Thus the electrolyte solution is decomposed and deteriorated, and in case of use as a battery, deterioration of the battery and a lowering of the charge and discharge life cycle thereof may result.

Especially when the silicon containing lithium represented by $Li_xSi$ ($0\leqq x\leqq5$) of the present invention is used as the negative electrode active material, rather than deterioration of the active material itself due to repetitive charge and discharge, an increase in internal resistance of the battery and the like due to accumulation of gas generated by deterioration and decomposition of the non-aqueous electrolyte solution causes deterioration in performance of the battery. In addition, the aforementioned capacity loss is also large, and it is impossible to sufficiently make use of the high charge and discharge capacity characteristics possessed by the active material.

In order to solve the problems as described above, the present invention further proposes the use of a non-aqueous electrolyte solution containing ethylene carbonate (EC) in the secondary battery using the silicon containing lithium $Li_xSi$ ($0\leqq x\leqq5$) as the negative electrode active material. Since EC has a high solidification point, it is desirably not more than 80% in volume ratio with respect to the whole solvent of the electrolyte solution. In addition, EC is a solvent having a high viscosity, so that in order to further enhance the ion conductivity and provide further stabilization, it is desirable that R.R' type alkyl carbonate (including R=R' type) represented by a chemical formula 1 is also contained.

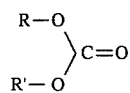
(Chemical formula 1)

In Formula 1, R and R' are alkyl groups represented by $C_nH_{2n+1}$, and in the case of n=1, 2, 3, 4, 5, the ion conductivity is preferably high to provide a low viscosity. Particularly, dimethyl carbonate (DMC), diethyl carbonate (DEC), methyl ethyl carbonate and the like, in which R and R' are a methyl group (n=1) or an ethyl group (n=2) in the chemical formula 1, are more preferable. Further, it is desirable that the solvent of the electrolyte solution be constituted by EC and the R.R' type alkyl carbonate be represented by the chemical formula 1, in which case the ion conductivity becomes maximum when the mixing ratio of EC and the R.R' type alkyl carbonate is about 1:1 in volume ratio, so that it is especially preferable that the mixing ratio is about 3:1 to 1:3 in volume ratio.

In addition, as the supporting electrolyte in the electrolyte solution, as described above, the lithium compound dissociating Li+ ion in the solvent, which does not directly react with the negative electrode and the positive electrode, is preferable, and for example, $LiClO_4$, $LiPF_6$, $LiBF_4$, $LiCF_3SO_3$, $Li(CF_3SO_2)_2N$ and the like are preferable.

The negative electrode using the silicon containing lithium $Li_xSi$ ($0 \leq x \leq 5$) as the active material can stably and repeatedly absorb and release lithium ions at least in a range of the electrode electric potential of 0–3 V with respect to a lithium reference electrode (metal lithium) in the non-aqueous electrolyte, which can be used as the negative electrode of the secondary battery capable of repeated charge and discharge owing to such an electrode reaction. The negative electrode is particularly provided with a charge and discharge region of high capacity in which lithium ion can be stably absorbed and released to perform repeated charge and discharge in a base electric potential region of 0–1 V with respect to the lithium reference electrode (metal lithium). In addition, by restricting the lithium content x to 0–5, an extremely stable secondary battery having a long life cycle can be obtained in which there is no deterioration due to decomposition of the electrolyte, there is no generation of passivation compounds due to deposition of lithium onto the negative electrode and the like even when charge and discharge are performed at a large current density, expansion of the electrode is small, and increase in battery internal resistance is remarkably reduced. Thus charge and discharge at a large current is possible, and little decrease in charge and discharge capacity due to repetition of charge and discharge is seen. When silicon or silicon containing lithium having an amorphous structure is used, a secondary battery can be obtained in which charge and discharge characteristics are excellent, and the life cycle is long.

On the other hand, a metal oxide containing a transition metal is used as the positive electrode active material, thereby lithium ions can be stably and repeatedly absorbed and released at a high electric potential of 3 V to not less than 4 V with respect to metal lithium in the non-aqueous electrolyte, and a positive electrode capable of repeated and stable charge and discharge can be obtained owing to such an electrode reaction. Such a positive electrode active material is combined with the negative electrode active material comprising the aforementioned silicon containing lithium $Li_xSi$ to constitute the non-aqueous electrolyte secondary battery, thereby providing a secondary battery having a high voltage of 2.5 V to not less than 4 V and a high energy density in which charge and discharge characteristics are excellent and the cycle deterioration is small.

When the composite oxide $Li_aM_bL_cO_2$ is used as the positive electrode active material, the electrode electric potential with respect to metal lithium has a high electric potential of about 4 V or more, reversible charge and discharge are possible by intercalation and deintercalation of Li ion at least between $0<a \leq 1.15$, deterioration due to excessive charge and excessive discharge is small, and excellent cycle characteristics are provided. Particularly, the polarization is small in $0.05c<0.5$ for the content c of B and/or Si, and the cycle characteristic is excellent. The reason why such excellent charge and discharge characteristics are obtained is not necessarily clear, however, it is presumed as follows. Namely, the positive electrode active material $Li_aM_bL_cO_2$ according to the present invention has a backbone structure which is similar to an $\alpha$-$NaCrO_2$ type in which a part of the transition metal M of an oxide $Li_aM_bO_2$ having a layered structure of the $\alpha$-$NaCrO_2$ type containing neither B nor Si is substituted by B or Si. However, the B atom and the Si atom can also exist at gaps between lattices of crystals and Li sites (substitute Li). In any case, it is presumed to be due to the fact that owing to the presence of B or Si, the crystal structure and the electron state change, so that Li ion conductivity is increased, and the absorption and release of lithium ion is facilitated.

Thus, the battery in which the negative electrode active material and the positive electrode active material according to the present invention are combined and used has especially excellent performance such that it has a high working voltage of about 4 V, the amount capable of reversibly absorbing and releasing lithium ion, that is the charge and discharge capacity, is extremely large, and the polarization of charge and discharge is small. Thus charge and discharge at a large current is possible, the observed deterioration such as decomposition of the active material due to excessive charge and excessive discharge is small, crystal collapse and the like is prevented, and an extremely stable battery having a long cycle life is obtained.

In addition, in the non-aqueous electrolyte secondary battery of the present invention using silicon containing lithium as the negative electrode active material, the non-aqueous electrolyte solution containing EC and the R.R' type alkyl carbonate represented by the chemical formula 1 as the electrolyte is used, thereby suppressing deterioration due to decomposition of the electrolyte solution during charge and discharge, and suppressing gas generation. Namely, when a non-aqueous electrolyte solution in which $LiClO_4$, $LiPF_6$ or the like is dissolved in EC having been hitherto most generally used in such a non-aqueous electrolyte secondary battery as the supporting electrolyte is used for the battery using the aforementioned silicon containing lithium $Li_xSi$ as the negative electrode active material, gas is generated due to decomposition of the electrolyte solution during charge, and the increase in discharge capacity due to repetitive charge and discharge is high. On the other hand, when an electrolyte solution containing EC, especially an electrolyte solution in which $LiClO_4$, $LiPF_6$ or the like is dissolved in a mixed solvent of EC and DEC or DMC as the supporting electrolyte is used, neither decomposition of the electrolyte solution nor generation of gas takes place. Thus it is possible to obtain a secondary battery having a high voltage and high energy and having a long life cycle and high reliability in which the capacity loss during charge and discharge is remarkably reduced, the charge and discharge efficiency is remarkably improved, and the high capacity densities inherent to the negative electrode and positive electrode active materials are utilized.

Further, when the negative electrode active material comprising the silicon containing lithium $Li_xSi$ ($0 \leq x \leq 5$) is used together with the non-aqueous electrolyte in which the lithium ion dissociating lithium compound is dissolved or used to make the solid solution in the organic solvent or polymer as described above, the battery reaction speed due to absorption and release of lithium ions at a temperature not more than a melting point of lithium metal (about 180° C.) is sufficiently large, so that it is especially suitable for non-aqueous electrolyte secondary batteries of the type working at room temperature or ordinary temperatures.

The present invention will be further explained in detail hereafter with reference to the preferred embodiments.

FIG. 1 is a cross-sectional view of a coin type battery showing one example of a non-aqueous electrolyte secondary battery according to the present invention. In the figure, 1 is a negative electrode case, which is also used as a negative electrode terminal, in which a plate made of stainless steel having one outer surface plated with Ni is subjected to drawing processing. 3 is a negative electrode constituted by using a negative electrode active material according to the present invention described below, which is adhered on the negative electrode case 1 by a negative electrode collector 2 made of a conductive adhesive using carbon as a conductive filler, and is electrically connected. 7 is a positive electrode case made of stainless steel having one outer surface plated with Ni, which is also used as a positive electrode terminal. 5 is a positive electrode constituted by a positive electrode active material according to the present invention described below, which is adhered on the positive electrode case 7 by a positive electrode collector 6 made of a conductive adhesive using carbon as a conductive filler, and is electrically connected. 4 is a separator made of a porous film of polypropylene, in which an electrolyte solution is impregnated. 8 is a gasket mainly comprising polypropylene, which intervenes between the negative electrode case 1 and the positive electrode case 7 to provide electric insulation between the negative electrode and the positive electrode and seals the contents of the battery in an air-tight manner by means of an opening edge of the positive electrode case which is bent and caulked toward the inside. With respect to the size of the battery, the outer diameter is 20 mm, and the thickness is 1.6 mm.

EMBODIMENT 1

The negative electrode 3 was produced as follows. Commercially available crystalline Si having a purity of not less than 99.9% was ground and graded into a particle diameter of not more than 53 μm using an automatic mortar and used as the negative electrode active material according to the present invention. The negative electrode active material obtained in such a manner was mixed with graphite as a conductive agent and a cross-linked type acrylic acid resin or the like as a binding agent in a weight ratio of 30:55:15 to provide a negative electrode mixture. Thereafter the negative electrode mixture was press-molded into a pallet having a diameter of 15 mm and a thickness of 0.3 mm by 2 ton/cm$^2$ to obtain a negative electrode pellet. The negative electrode pellet was adhered on the negative electrode case 1 using the negative electrode collector 2 made of the conductive resin adhesive using carbon as the conductive filler so as to perform heating and drying at 200° C. for 10 hours under a reduced pressure. Thereafter, a lithium foil having a predetermined thickness was punched and adhered by pressure onto the negative electrode pellet. A lithium-negative electrode pellet laminated electrode obtained in such a manner was used as the negative electrode.

The positive electrode 5 was produced as follows. Lithium hydroxide LiOH.H$_2$O, cobalt carbonate CoCO$_3$ and boron oxide B$_2$O$_3$ were weighed to provide a molar ratio of Li:Co:B of 1.0:0.9:0.1, which were sufficiently mixed using a mortar. Thereafter, the mixture was heated and baked in air at a temperature of 850° C. for 12 hours to be cooled, followed by grinding and grading into a particle diameter of not more than 53 μm. The heating, grinding and grading were repeated twice to synthesize a positive electrode active material LiCO$_{0.9}$B$_{0.1}$O$_2$ of the present embodiment.

The product was used as the positive electrode active material, with which was mixed graphite as a conductive agent and fluorine resin or the like as a binding agent in a weight ratio of 80:15:5 to provide a positive electrode mixture. The positive electrode mixture was then press-molded into a pellet having a diameter of 16.2 mm and a thickness of 0.52 mm by a pressure of 2 ton/cm$^2$, followed by heating and drying at 100° C. for 10 hours under a reduced pressure.

An electrolyte solution was prepared in which lithium hexafluorophosphate LiPF$_6$ was dissolved by 1 mol/l in a mixed solvent with a volume ratio of 1:1 of ethylene carbonate and diethyl carbonate.

A battery produced in such a manner (designated as battery A) was left and subjected to aging at room temperature for 1 week, followed by performing a charge and discharge test as described below. Owing to the aging, the lithium-negative electrode pellet laminated electrode of the negative electrode 3 contacted with the non-aqueous electrolyte solution in the battery, such that lithium and the negative electrode pellet formed a certain local cell to perform a spontaneous reaction. Substantially all of the lithium foil was electrochemically absorbed by the negative electrode mixture, and silicon Si used as the negative electrode active material generated silicon containing lithium Li$_{x1}$Si (x1 was about 1).

Figure 2:
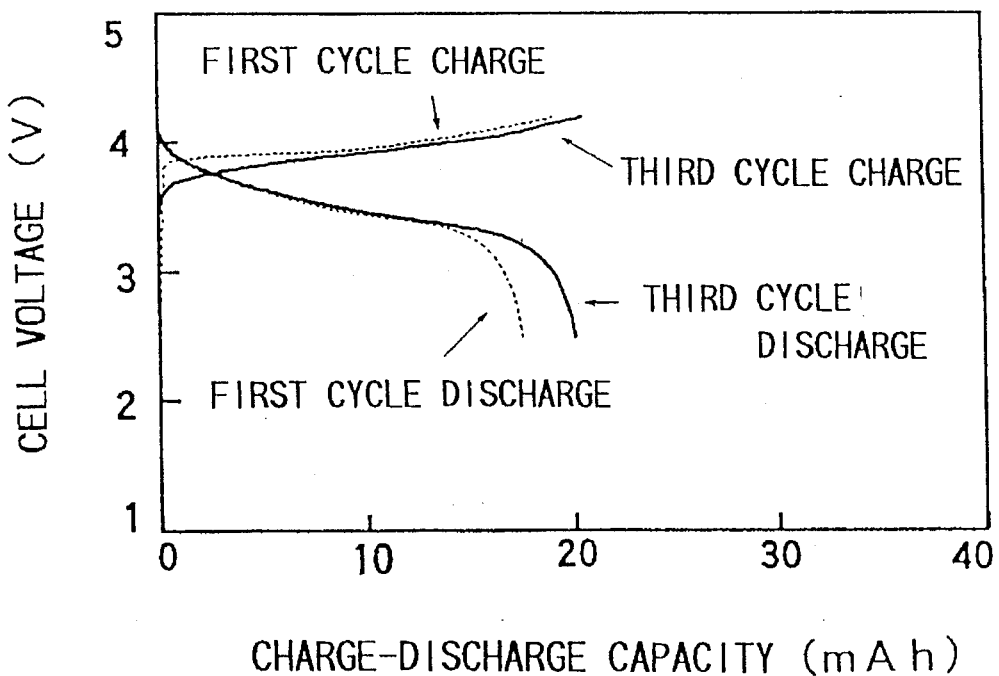
FIG. 2 is an explanatory view showing charge and discharge characteristics at the first cycle and the third cycle of a battery according to the present invention.
Figure 3:
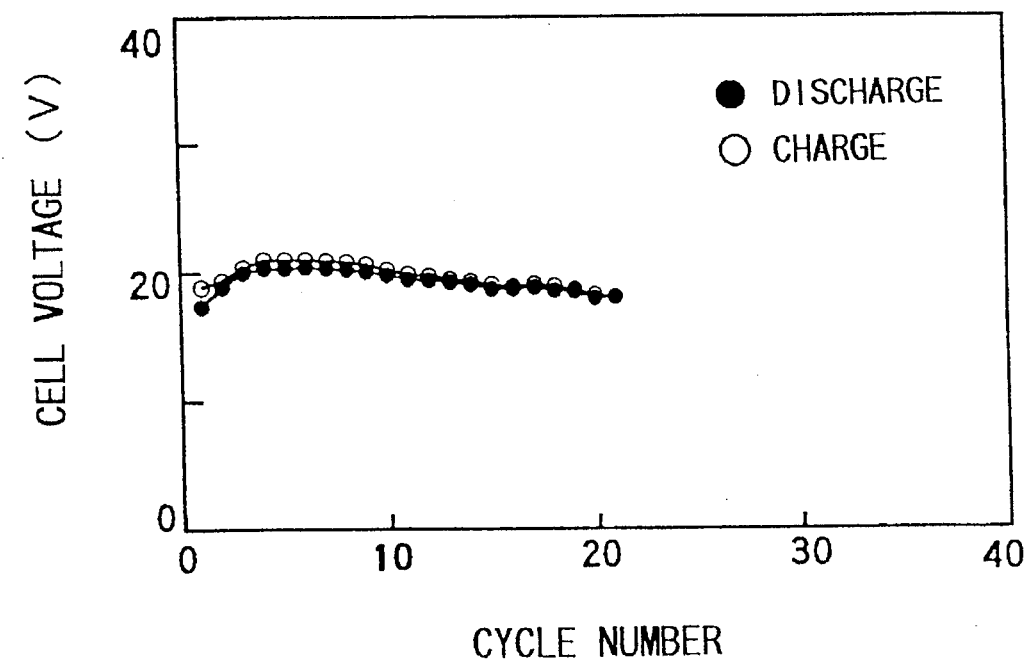
FIG. 3 is an explanatory view showing cycle characteristics of a battery according to the present invention.

Charge and discharge characteristics at the first cycle and the third cycle are shown in FIG. 2, and the cycle characteristic is shown in FIG. 3 for the case when the battery A was subjected to charge and discharge cycles under conditions of a constant current of 1 mA, an end voltage of charge of 4.2 V, and an end voltage discharge of 2.5 V. Incidentally, the charge and discharge cycles were started by charge.

In the battery A thus constructed, lithium ions are released by charge from the positive electrode active material into the electrolyte solution, the lithium ions move in the electrolyte solution to perform an electrode reaction with the negative electrode active material, and lithium ions are electrochemically absorbed into the negative electrode active material to generate silicon containing lithium, in which the lithium content increased Li$_{x2}$Si. Furthermore, since lithium ions are released during discharge into the electrolyte solution from the silicon containing lithium of the negative electrode, which moves in the electrolyte solution to be absorbed by the positive electrode active material, charge and discharge can be performed stably and repeatedly. Herein, the total lithium amount, in which the lithium amount adhered by pressure on the negative electrode pellet is added with the lithium amount capable of release by charge among lithium contained in the positive electrode active material, is restricted to be not more than 5 in a molar ratio with respect to the silicon amount of the negative electrode so as to form the battery. Thus the negative electrode active material contains lithium after generation of silicon containing lithium Li$_{x'}$Si (x'≦5) due to aging after the assembly of the battery and the first charge even during the following charge-discharge cycles except for during complete discharge, and forms silicon containing lithium Li$_x$Si (0≦x≦5) in which the lithium content x is not more than 5.

As clarified from FIGS. 2 and 3, it is understood that the battery A according to the present invention has an extremely large charge and discharge capacity. In addition, decrease in discharge capacity with respect to the charge capacity (charge and discharge efficiency) is extremely small except for the first cycle, and decrease in discharge capacity due to repeated charge and discharge (cycle deterioration) is also small. Further, it is understood that difference in working voltage between charge and discharge is extremely small over the entire charge and discharge region, polarization of the battery (internal resistance) is extremely small, and charge and discharge at a large current are facilitated.

EMBODIMENT 2

In the present embodiment, a similar battery B was produced exactly in the same manner a Embodiment 1 except that a positive electrode active material produced as follows was used instead of the positive electrode active material of Embodiment 1.

The positive electrode active material was produced as follows. Lithium hydroxide $LiOH \cdot H_2O$, cobalt carbonate $CoCO_3$ and silicon dioxide $SiO_2$ were weighed to provide a molar ratio of Li:Co:Si of 1:0.9:0.1, which were sufficiently mixed using a mortar, and thereafter the mixture was heated and baked in air at a temperature of 850° C. for 12 hours to be cooled, followed by grinding and grading into a particle diameter of not more than 53 µm. The heating, grinding and grading were repeated twice to synthesize a positive electrode active material having an approximate composition of $LiCo_{0.9}Si_{0.1}O_2$ of the present embodiment.

Also for the battery B obtained in such a manner, when a charge and discharge cycle test was performed in the same manner as Embodiment 1 under conditions of a constant current of 1 mA, an end voltage of charge of 4.2 V and an end voltage of discharge of 2.5 V, a maximum discharge capacity of 21 mAh was obtained at the fifth cycle, and excellent charge and discharge characteristics, cycle efficiency and life cycle approximately the same as those of the battery A in Embodiment 1 were presented.

EMBODIMENT 3

The present embodiment resides in a case in which the following negative electrode active material was used instead of the negative electrode active material of Embodiment 1. A similar battery C was produced in the same manner as Embodiment 1 except for the negative electrode active material.

The negative electrode active material of the present Embodiment was produced as follows. $SiH_4$ gas was subjected to plasma decomposition on both surfaces of a crystalline silicon substrate having a thickness of 100 µm to deposit amorphous silicon containing about 10% of hydrogen by 0.5 µm, and the thus obtained amorphous coated silicon substrate was ground and graded into a particle diameter of not more than 53 µm. The amorphous-crystalline composite silicon obtained in such a manner was used as the negative electrode active material.

Also for the battery C obtained in such a manner, when a charge and discharge cycle test was performed in the same manner as Embodiment 1 under conditions of a constant current of 1 mA, an end voltage of charge of 4.2 V and an end voltage of discharge of 2.5 V, a maximum discharge capacity of 25 mAh was presented at the first cycle, which was larger than the maximum capacity of the battery A of Embodiment 1 by about 20% and cycle deterioration was at a level approximately the same as that of battery A. It is understood that improved charge and discharge characteristics are obtained as compared with the battery A.

As described above in detail, the present invention uses silicon containing lithium $Li_xSi$ ($0 \leq x \leq 5$) as the negative electrode active material of the non-aqueous electrolyte secondary battery, metal oxide containing the transition metal as the positive electrode active material, and lithium ion-conductive non-aqueous electrolyte in which a lithium compound is dissolved or made into a solid solution in the organic solvent or polymer as an electrolyte. Furthermore, by simultaneously combining and using such negative electrode active material, positive electrode active material, and non-aqueous electrolyte, it is possible to obtain an extremely stable secondary battery having a long life cycle with a high voltage and a high energy density in which charge and discharge characteristics at a large current are excellent, and little deterioration, such as generation of irreversible materials and the like, is observed due to excessive charge and discharge.

We claim:

1. A non-aqueous electrolyte secondary battery comprising:
   a negative electrode having an active material comprised of silicon or a silicon alloy containing lithium represented by composition formula $Li_xSi$ where x satisfies $0 \leq x \leq 1$, the silicon or silicon alloy containing absorbed lithium ions resulting from an electrochemical reaction between the negative electrode and a lithium metal or a material containing lithium;
   a positive electrode having an active material comprised of a transition metal oxide; and
   a lithium ion-conductive non-aqueous electrolyte having at least one lithium compound and an organic solvent or a solid polymer.

2. A non-aqueous electrolyte secondary battery comprising: a negative electrode having an active material comprised of silicon or a silicon alloy containing lithium which is amorphous and is represented by composition formula $Li_xSi$ where x satisfies $0 \leq x \leq 5$, the silicon or silicon alloy containing absorbed lithium ions resulting from an electrochemical reaction between the negative electrode and a lithium metal or a material containing lithium; a positive electrode having an active material comprised of a transition metal oxide; and a lithium ion-conductive non-aqueous electrolyte having at least one lithium compound and an organic solvent or a solid polymer.

3. A non-aqueous electrolyte secondary battery according to claim 1; wherein the negative electrode further comprises an electron-conductive carbon and a resin binding agent.

4. A non-aqueous electrolyte secondary battery according to claim 1; wherein the positive electrode active material comprises a composite oxide of lithium and a metalloid represented by composition formula $Li_aM_bL_cO_2$ where M is one or more transition metal elements, L is one or more species of metalloid elements selected from boron B and silicon Si, and a, b, and c satisfy $0 < a \leq 1.15$, $0.85 \leq b+c \leq 1.3$ and $0 \leq c$.

5. A non-aqueous electrolyte secondary battery according to claim 1; wherein the non-aqueous electrolyte comprises an organic solvent comprised of ethylene carbonate.

6. A non-aqueous electrolyte secondary battery according to claim 2; wherein the lithium content x in composition formula $Li_xSi$ satisfies $0 \leq x < 1$.

7. A non-aqueous electrolyte secondary battery according to claim 2; wherein the positive electrode active material comprises a composite oxide of lithium and a metalloid represented by composition formula $Li_aM_bL_cO_2$ where M is one or more transition metal elements, L is one or more species of metalloid elements selected from boron B and silicon Si, and a, b, and c satisfy $0 < a \leq 1.15$, $0.85 \leq b+c \leq 1.3$ and $0 \leq c$.

8. A non-aqueous electrolyte secondary battery according to claim 2; wherein the non-aqueous electrolyte comprises an organic solvent comprised of ethylene carbonate.

9. A non-aqueous electrolyte secondary battery according to claim 2; wherein the negative electrode further comprises an electron-conductive carbon and a resin binding agent.

10. A non-aqueous electrolyte secondary battery according to claim 3; wherein the positive electrode active material further comprises a composite oxide of lithium and a metalloid represented by composition formula $Li_aM_bL_cO_2$ where M is one or more transition metal elements, L is one or more species of metalloid elements selected from boron B and silicon Si, and a, b, and c satisfy $0<a\leq1.15$, $0.85\leq b+c\leq1.3$ and $0\leq c$.

11. A non-aqueous electrolyte secondary battery according to claim 10; wherein the non-aqueous electrolyte comprises an organic solvent comprised of ethylene carbonate.

12. A method for producing a negative electrode for a non-aqueous electrolyte secondary battery having a positive electrode and a lithium ion-conductive non-aqueous electrolyte, comprising the steps of:

mixing at least silicon powder or silicon alloy powder represented by composition formula $Li_xSi$ where x satisfies $0\leq x\leq1$, an electron-conductive carbon powder and a resin binding agent to produce a mixture;

forming the mixture into a predetermined shape to obtain a negative electrode substrate; and placing the negative electrode substrate and a lithium metal or a material containing lithium in contact with the lithium ion-conductive non-aqueous electrolyte of the non-aqueous electrolyte secondary battery and effecting electrochemical reaction between the negative electrode substrate and the lithium metal or the material containing lithium to allow the negative electrode substrate to absorb lithium ions from the lithium metal or the material containing lithium.

13. A non-aqueous electrolyte secondary battery comprising: a negative electrode having an active material comprised of silicon or a silicon alloy containing lithium which is amorphous and is represented by composition formula $Li_xSi$ where x satisfies $0\leq x\leq5$, the silicon or silicon alloy containing absorbed lithium ions resulting from an electrochemical reaction between the negative electrode and a lithium metal or a material containing lithium; a positive electrode having an active material comprised of a transition metal oxide; and a lithium ion-conductive non-aqueous electrolyte.

14. A non-aqueous electrolyte secondary battery according to claim 5; wherein the non-aqueous electrolyte further comprises an R.R' type alkyl carbonate represented by a formula 1,

(formula 1)

where R and R' are alkyl groups indicated as $C_nH_{2n+1}$ in formula 1.

15. A non-aqueous electrolyte secondary battery according to claim 14; wherein the R.R' type alkyl carbonate is selected from the group consisting of dimethyl carbonate, diethyl carbonate and methyl ethyl carbonate.

16. A non-aqueous electrolyte secondary battery according to claim 8; wherein the non-aqueous electrolyte further comprises an R.R' type alkyl carbonate represented by a formula 1,

(formula 1)

where R and R' are alkyl groups indicated as $C_nH_{2n+1}$ in formula 1.

* * * * *